(No Model.)
W. G. STAPLES.
SECTIONAL MOLD.
No. 548,895. Patented Oct. 29, 1895.
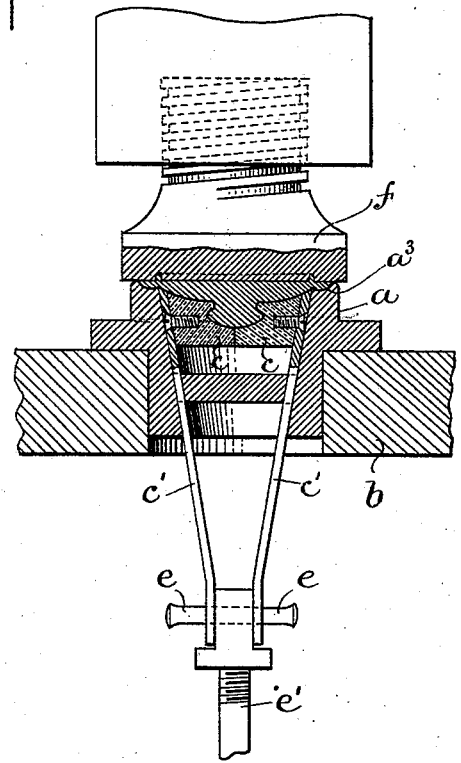
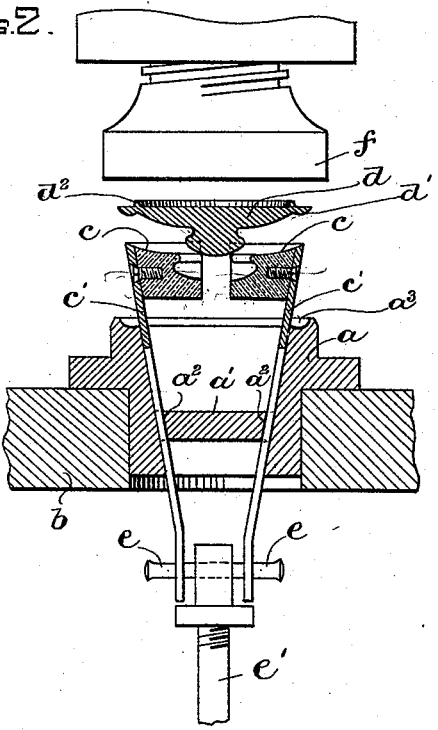
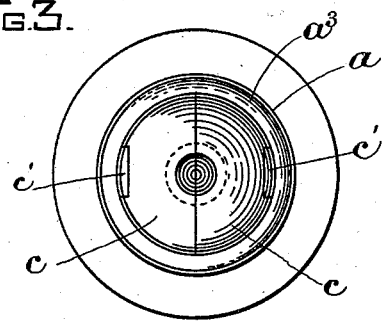
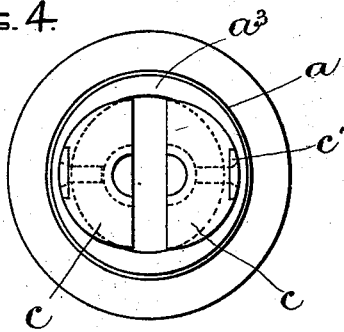
WITNESSES:
A. D. Harris
Rollin Abell
INVENTOR
W. G. Staples
by Wright Brown Quinby
Atty.

UNITED STATES PATENT OFFICE.

WILLARD G. STAPLES, OF BROOKFIELD, MASSACHUSETTS, ASSIGNOR OF ONE-HALF TO GEORGE MESSINGER, OF SAME PLACE.

SECTIONAL MOLD.

SPECIFICATION forming part of Letters Patent No. 548,895, dated October 29, 1895.

Application filed March 4, 1895. Serial No. 540,393. (No model.)

*To all whom it may concern:*

Be it known that I, WILLARD G. STAPLES, of Brookfield, in the county of Worcester and State of Massachusetts, have invented certain new and useful Improvements in Sectional Molds, of which the following is a specification.

This invention relates to sectional molds for forming articles the shape of which is such as to require the separation of sections of the mold in order to release the formed article.

The invention has for its object to provide a simple and conveniently-operated sectional mold; and it consists in the improvements which I will now proceed to describe and claim.

Of the accompanying drawings, forming a part of this specification, Figure 1 represents a vertical section of my improved mold, the parts thereof being shown in operative position with the formed article in contact with the parts of the mold. Fig. 2 represents a similar section showing the parts of the mold separated and the formed article released. Fig. 3 is a plan view of the mold in the position shown in Fig. 1, the top platen and the formed article being removed. Fig. 4 represents a view similar to Fig. 3, showing the movable separable sections in the same position as shown in Fig. 2.

The same letters of reference indicate the same parts in all the figures.

In the drawings, $a$ represents an annular base or support, which may be affixed to a bench or table $b$ or may be rigidly supported in any suitable manner. The base $a$ has an internal tapering orifice, across which extends a fixed cross-bar $a'$, at the end portions of which are slots $a^2 a^2$, which, with the corresponding internal surfaces of the base $a$, constitute inclined guides, the purpose of which will be presently explained.

$c\ c$ represent separable mold-sections, which are formed so that they may be inserted in the upper portion of the tapering orifice in the base $a$, as shown in Fig. 1, and when so inserted will be rigidly supported by the base in operative relation to each other, said sections being close together, so that the molding-surface of each is practically continuous with that of the other, said surfaces being formed in this case to mold portions of the top surface and knob or handle of a lid or cover $d$. To the sections $c\ c$ are affixed arms or shanks $c'\ c'$, which are inclined for a greater portion of their length and correspond to the inclination of the wall of the orifice through the base $a$ and bear upon said wall, said shanks passing through the guides $a^2\ a^2$ above mentioned. The lower portions of said shanks are provided with orifices which loosely encircle arms $e\ e$, formed on a vertically-movable rod $e'$, which may be raised by a treadle or any other suitable means to raise the sections $c\ c$ from the base $a$. When said sections are raised, the inclined shanks and their guides co-operate in separating the sections from each other and thus releasing the formed article $d$, as shown in Fig. 2, the shanks sliding outwardly upon the arms $e\ e$. When the rod $e'$ is depressed, the inclined guides and shanks co-operate in forcing the sections $c\ c$ together, so that when the sections reach their seat upon the base $a$ they are pressed together, as shown in Fig. 1, the shanks sliding inwardly upon the arms $e\ e$.

I prefer to provide the base $a$ with an annular molding-face $a^3$, which surrounds the sections $c\ c$ when the latter are in their operative position, and forms the beaded outer portion $d'$ of the cover $d$, as shown in Fig. 1.

$f$ represents a top presser or platen which is movable toward and from the base $a$ and has a molding-face formed to co-operate with the devices above described in forming the article $d$, the said platen having in this case an annular groove which forms the rib or flange $d^2$.

It will be seen that the described devices constitute a simple and effective means for forming an article with recessed or under-cut surfaces, and readily releases the formed article, so that it may be readily removed, the inclined arms or shanks co-operating with the fixed guides in positively moving the mold-sections $c\ c$ away from each other while they are being raised or ejected from the fixed support or base $a$, so that they cannot be held closed upon the molded article by the adhesive properties of the latter.

I do not limit myself to the particular form of the molding-faces here shown, and may adapt my invention to the production of articles of any desired form.

I claim—

1. A sectional mold comprising the fixed support or base having a continuous annular mold face and an internal seat within and below said face, the separable mold-sections formed to enter the support and bear on said seat and having mold faces which are surrounded by and continuous with the said annular mold face when said sections are in operative position, and means for simultaneously ejecting said sections from the support and positively separating them from each other.

2. The combination of the separable mold-sections having inclined arms or shanks, the fixed support or base surrounding said sections and having an internal seat which holds said sections in operative relation to each other, the fixed inclined guides engaged with said shanks, and the lifting device comprising a vertical rod or stud and lateral arms projecting therefrom and passing loosely through orifices in said shanks, said lifting device and shanks co-operating with the guides in positively separating the sections while ejecting them from the support.

In testimony whereof I have signed my name to this specification, in the presence of two subscribing witnesses, this 23d day of February, A. D. 1895.

WILLARD G. STAPLES.

Witnesses:
DWIGHT FAIRBANKS,
BENJAMIN F. BLODGETT.